(12) United States Patent
Simpson et al.

(10) Patent No.: US 10,687,412 B1
(45) Date of Patent: Jun. 16, 2020

(54) PHOTONIC-CRYSTAL-FIBER-DELIVERED LASER-TRIGGERED HIGH-VOLTAGE GAS SWITCH

(71) Applicants: National Technology & Engineering Solutions of Sandia, LLC, Albuquerque, NM (US); Colorado State University Research Foundation, Fort Collins, CO (US)

(72) Inventors: Sean Simpson, Rio Rancho, NM (US); Owen Johns, Albuquerque, NM (US); Charles E. Rose, Severance, CO (US); Azer Yalin, Fort Collins, CO (US); Ciprian Dumitrache, Paris (FR)

(73) Assignees: National Technology & Engineering Solutions of Sandia, LLC, Albuquerque, NM (US); Colorado State University Research Foundation, Fort Collins, CO (US)

( * ) Notice: Subject to any disclaimer, the term of this patent is extended or adjusted under 35 U.S.C. 154(b) by 0 days.

(21) Appl. No.: 16/564,685

(22) Filed: Sep. 9, 2019

(51) Int. Cl.
  *H05H 1/52* (2006.01)
  *G02B 6/02* (2006.01)
(52) U.S. Cl.
  CPC .......... *H05H 1/52* (2013.01); *G02B 6/02328* (2013.01)
(58) Field of Classification Search
  CPC .............................. H05H 1/52; G02B 6/02328
  See application file for complete search history.

(56) References Cited

U.S. PATENT DOCUMENTS

| | | | | |
|---|---|---|---|---|
| 4,890,040 A * | 12/1989 | Gundersen | ............... | H03K 3/55 315/155 |
| 4,978,893 A * | 12/1990 | Brannon | ................... | H01T 2/00 313/311 |
| 5,005,180 A * | 4/1991 | Edelman | .............. | A61B 18/245 372/57 |
| 9,048,000 B2 * | 6/2015 | Smith | .................... | B82Y 10/00 |
| 9,294,085 B1 | 3/2016 | Gruner et al. | | |
| 2019/0120219 A1 * | 4/2019 | Calomeris | ............... | F04B 53/10 |
| 2019/0319432 A1 * | 10/2019 | Liao | ....................... | H03K 17/54 |

OTHER PUBLICATIONS

Robert E. Beverly III, Fiber-Optic Triggering of a 50-kV Switch Using 532-nm Laser Light, Oct. 2014, IEEE Transaction on Plasma Science, vol. 43, No. 10, pp. 2962-2967 (Year: 2014).*

Larsson, A. et al., "Test Bed for Time Jitter Studies of Laser-Triggered Gas-Discharge Switches", Proc. 18th IEEE PPC, Chicago, IL (Jun. 2011), 6 pages.

(Continued)

*Primary Examiner* — Raymond R Chai
(74) *Attorney, Agent, or Firm* — Kevin W. Bieg

(57) ABSTRACT

A photonic-crystal-fiber-delivered laser-triggered high-voltage gas switch can deliver a peak irradiance of greater than $5.1 \times 10^{11}$ W/cm² to the AK gap for a laser having a wavelength of 1064 nm. The switch is capable of operating at pressures up to 2200 psi; voltages across the gap of greater than 200 kV; operation at less than 70% self-break voltage; shot-to-shot jitter of less than 3 ns; AK gap distances of 3 mm or smaller; and triggering via a fiber-delivered laser pulse energy of as low as 500 µJ.

17 Claims, 4 Drawing Sheets

(56) References Cited

OTHER PUBLICATIONS

Larsson, A. et al., "Laser Triggering of Spark Gap Switches", IEEE Transactions on Plasma Science, vol. 42 (2014), pp. 2943-2947.
Glover, S.F. et al., "Laser Triggering of Spark Gap Switches with Less than 100uJ's of Energy", Proc. 16th IEEE PPC, Albuquerque, NM (2007), pp. 240-244.
Itoh, Y. et al., "High-power Krf laser transmission through optical fibers and its application to the triggering of gas switches", Journal of Applied Physics, vol. 54 (1983), pp. 2956-2961.
Harjes, H.C. et al., "Space-Charge Effects in a Laser Fiber-Optics Triggered Multichannel Spark Gap", IEEE Transactions on Plasma Science, vol. PS-10, No. 4 (1982), pp. 261-265.
Harjes, H.C. et al., "Laser Triggering Through Fiber Optics of a Low Jitter Spark Gap", IEEE Transactions on Plasma Science, vol. PS-8, No. 3 (1980) pp. 170-176.
Beverly, R.E. et al., "Reliable Fiber-Optic Triggering of a 50-kV Switch Using 532-nm Laser Light", IEEE Transactions on Plasma Science, vol. 42, No. 10 (2014), pp. 2962-2967.
Debord, B. et al., "Multi-meter fiber-delivery and pulse self-compression of milli-Joule femtosecond laser and fiber-aided laser-micromachining", Optics Express, vol. 22 (2014), pp. 10735-10746.
Wang, Y.Y. et al., "Low loss broadband transmission in hypocycloid-core Kagome hollow-core photonic crystal fiber", Optics Letters, vol. 36 (2011), pp. 669-671.

\* cited by examiner

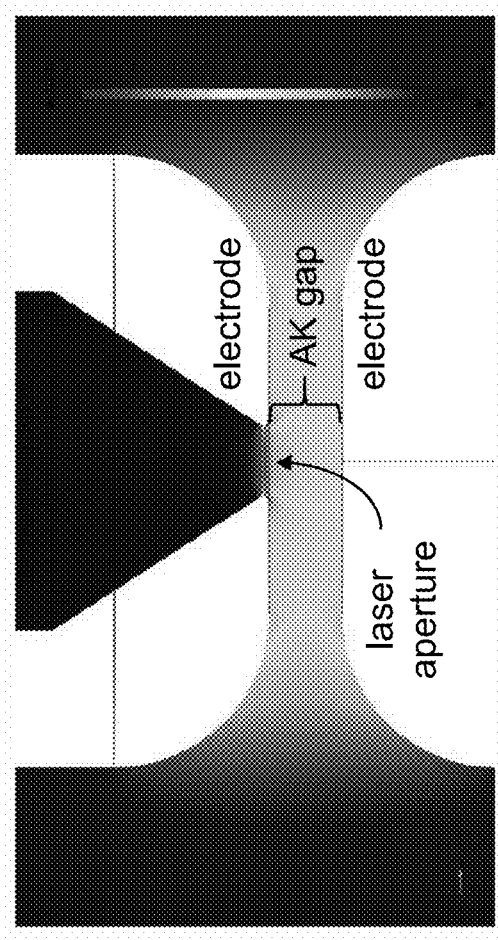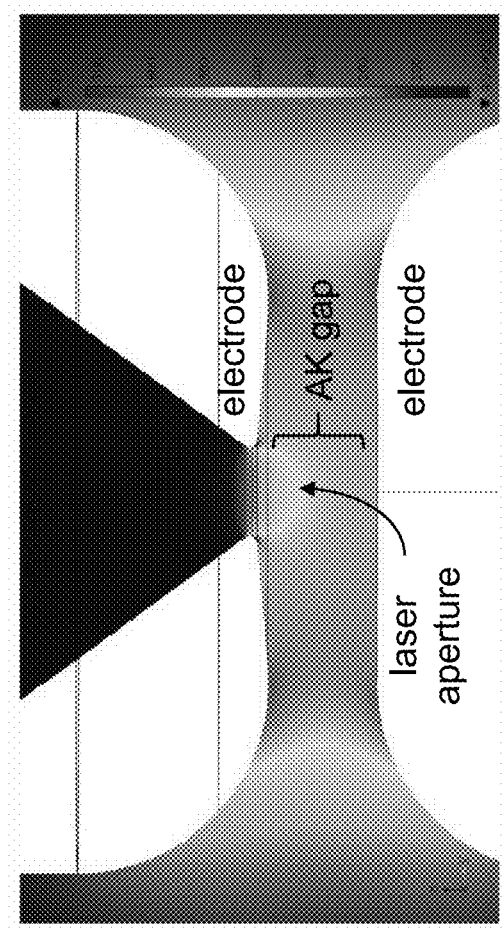
FIG. 4A
FIG. 4B

US 10,687,412 B1

PHOTONIC-CRYSTAL-FIBER-DELIVERED LASER-TRIGGERED HIGH-VOLTAGE GAS SWITCH

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to high-voltage gas switch technology and, in particular, to a photonic-crystal-fiber (PCF)-delivered laser-triggered high-voltage (HV) gas switch.

BACKGROUND OF THE INVENTION

High voltage, low inductance, low jitter, and high longevity gas switches are often required for pulsed-power applications. See U.S. Pat. No. 9,294,085, issued Mar. 3, 2016, which is incorporated herein by reference. Laser triggering is often used to decrease the probability of pre-fires or misfires in high-voltage gas switches. Current laser triggered switches rely on plasma formation at the surface of the opposing electrode or on a local plasma formed in the midplane gap between the two electrodes. See A. Larsson et al., "Test bed for time jitter studies of laser-triggered gas-discharge switches," Proc. 18$^{th}$ IEEE PPC, Chicago, Ill., USA June 2011, pp. 760-765; A. Larsson et al., "Laser triggering of spark gap switches," IEEE Trans. Plasma Sci. 42(10), 2943 (2014); S. F. Glover et al., "Laser triggering of spark gap switches with less than 100 mJ's of energy," Proc. 16$^{th}$ IEEE PPC, Albuquerque, N. Mex., USA June 2007, pp. 240-244; Y. Itoh et al., J. Appl. Phys. 54(6)2956 (1983); H. C. Harjes et al., IEEE Trans. Plasma Sci. 10(4), 261 (1982); and H. C. Harjes et al., IEEE Trans Plasma Sci. 8(3) 170 (1980).

However, there remains a need for reliable triggering of small form-factor, low-inductance high-voltage gas switches that are capable of fast rise times (e.g., less than 20 ns) into low impedance loads (e.g., less than 10 ohms).

SUMMARY OF THE INVENTION

The present invention is directed to a laser-triggered HV gas switch wherein the laser trigger is delivered to the anode-cathode (AK) gap of the switch via a hollow-core photonic-crystal-fiber (HC PCF). The laser-triggered HV gas switch comprises two opposing electrodes (forming an AK gap) and an optical spark plug. One electrode is solid while the other electrode has a recessed machined into the body, allowing for the fiber-coupled optical spark plug to be installed. An exemplary fiber-delivery system is comprised of a high power Nd:YAG pulsed laser (FHWM~5 ns, 1064 nm wavelength, $M^2$~1.25) that is coupled into a HC PCF that propagates the laser pulse through the optical spark plug to the AK gap of the switch. The peak irradiance of the laser trigger can be greater than $5.1 \times 10^{11}$ W/cm$^2$ for a laser having a wavelength of 1064 nm. The invention allows for fiber-delivery of high energy laser pulses into the AK gap of a high-voltage gas switch, generating a plasma therein and facilitating command fire switch closure.

The switch is capable of operating at pressures up to 2200 psi; voltages across the AK gap of greater than 200 kV; operation at less than 70% self-break voltage; shot-to-shot jitter of less than 3 ns; AK gap distances of 3 mm or smaller; and triggering via a fiber-delivered laser pulse of 14 mJ or less energy. More particularly, the invention can generate a laser-induced plasma in the AK gap at laser pulse energies as small as 500 µJ by leveraging the near single-mode output of a HC PCF.

BRIEF DESCRIPTION OF THE DRAWINGS

The detailed description will refer to the following drawings, wherein like elements are referred to by like numbers.

FIGS. 4A and 4B are electric field maps before and after optimization to allow for a laser aperture into the gap. FIG. 4A is a map with a field stress of ~1048 kV/cm with a 3 mm gap at 200 kV. FIG. 4B is a map of an alternative electrode surface with a field stress reduced to 725 kV/cm with a 3 mm gap at 200 kV.

DETAILED DESCRIPTION OF THE INVENTION

Laser triggering via optical fibers has had limited success due to the need to produce sufficient energy for gas breakdown. Single-mode fibers may suffer damage at the required energy for nanosecond pulses. Larger diameter, higher energy multi-mode fibers may generate higher order modes during propagation, limiting the achievable minimum focal spot size; typically, 2-200× larger than the diffraction-limited spot size of the optical system. Recently, optimization of the optical setup has resulted in reliable fiber-delivered laser triggering of a 50-kV gas switch with <40 psi of air and a gap spacing of 6 mm with minimum runtime and jitter. See R. E. Beverly III, IEEE Trans. Plasma Sci. 42(10), 2962 (2014). In these experiments, both 200 µm and 400 µm silica core step-index fibers were tested that delivered pulse energies of ~2.8-3.5 mJ at 532 nm into the gap. In this configuration, a switch run-time of 44 ns with a σ=3.1 ns of jitter at 50 kV and 38.5 psi gas pressure was achieved. However, the on-axis fiber-delivery system was incapable of generating a plasma in the gas due to the limitation of the multi-mode fibers, resulting in plasma generation solely at the surface of the opposing electrode.

The minimum spot size for a fiber-delivered laser beam is given by:

$$d_{minimum} = 4 M^2 f \lambda / \pi D \qquad (1)$$

where $M^2$ is the beam quality from the fiber or laser, f is the focal length of the final focusing lens, $\lambda$ is the wavelength, and D is the collimated input spot-size at the final focusing lens. The diffraction-limited spot size (DLSS) is realized when $M^2=1$. The peak irradiance at the minimum spot is then:

$$I_{Bd} = E_{pulse} / \left( t_{pulse} * \pi \left( \frac{d}{2} \right)^2 \right) \qquad (2)$$

where $I_{Bd}$ is the peak irradiance in W/cm², $E_{pulse}$ is the laser pulse energy in Joules, $t_{pulse}$ is the pulse width in seconds, and d is the spot size. It can be estimated using Eq. (1) that the Beverly fiber delivery system yielded a 110 μm minimum spot size (M² was estimated to be 4 for the 200 μm fiber). According to Eq. (2), the peak irradiance with ~3 mJ in 5 ns laser pulse can then estimated to be about 6.3×10⁹ W/cm² for the Beverly system.

Figure 1:
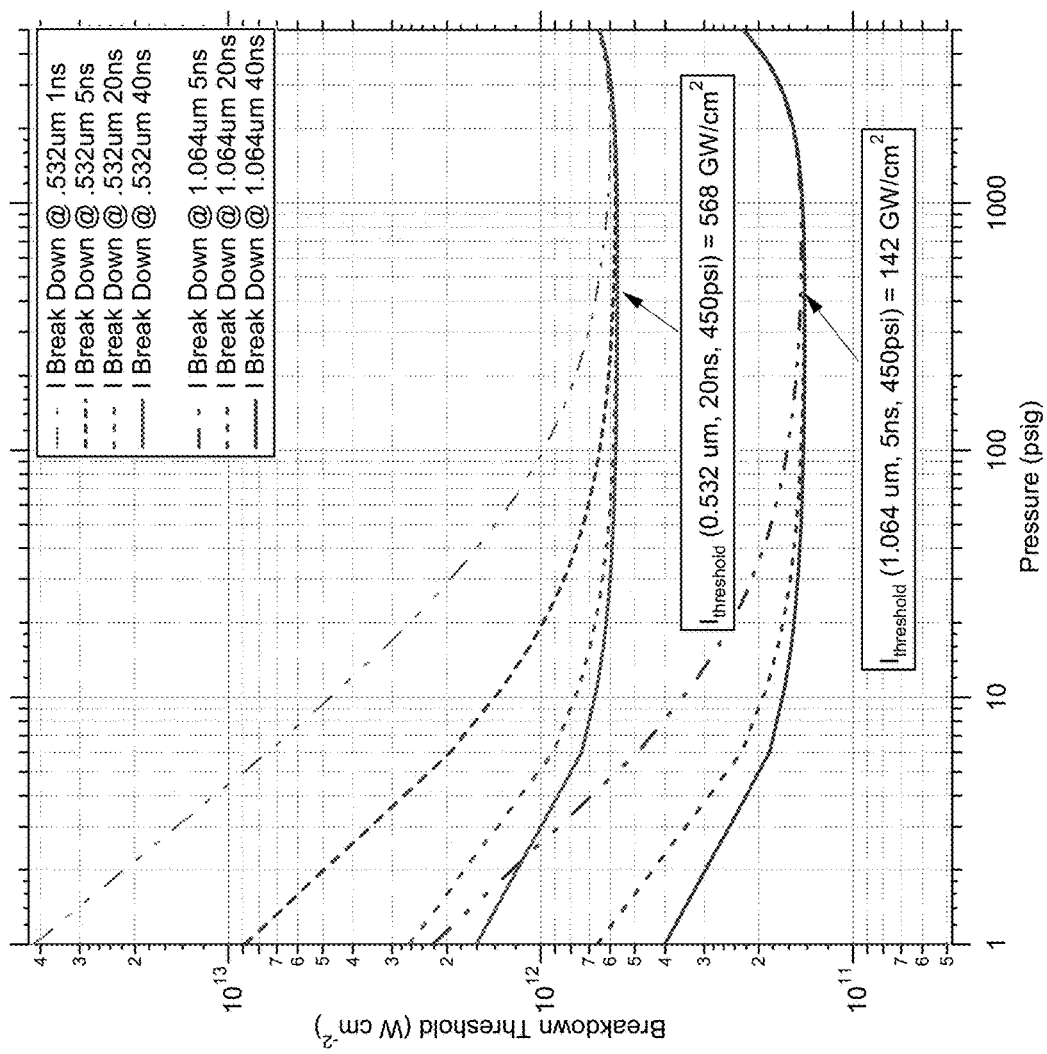
FIG. 1 is a graph of peak irradiance thresholds for generating plasma in air at various pressures.

More generally, the breakdown threshold intensity in air is given by $$I_{Bd} = \frac{8 \times 10^2}{Pt_p\lambda^2}(1 + 4.5 \times 10^{-6} P^2 \lambda^2)(1 + 2 \times 10^8 t_p P) \tag{3}$$

where $I_{Bd}$ is the breakdown irradiance in W/cm², P is the pressure in atmospheres, $t_p$ is the laser pulse duration in seconds, and λ is the wavelength in μm. See D. C. Smith, *Opt. Eng.* 20(6), 962 (1981). FIG. 1 shows the dependence of the breakdown threshold intensity on the laser wavelength and the overall pulse duration. As can be seen, the peak irradiance of the Beverly fiber is nearly 3-4 orders of magnitude less irradiance than the threshold for generating a plasma in air, as shown by the family of curves for λ=0.532 μm. Therefore, even if it were possible to reduce Beverly's final spot size by an order of magnitude with a higher demagnification ratio, it would still be an order of magnitude less than the required breakdown irradiance of $I_{Bd}$=1.42× 10¹¹ W/cm² for plasma formation at 1064 nm at P>100 psi.

According to the present invention, a PCF is used to deliver an improved trigger laser beam quality and irradiance to the AK gap of a HV gas switch. PCFs are a class of microstructured optical fibers based on the properties of photonic crystals, wherein light is guided by structural modifications, and not only by refractive index differences as with conventional multi-mode fibers. See F. Poli et al., *Photonic Crystal Fibers*, Springer, Dordrecht, The Netherlands (2007); and Hollow Core Optical Fibers, edited by Walter Belardi, MDPI Publishing, Basel, Switzerland (2019). Therefore, PCFs can confine light in hollow cores with confinement characteristics not possible in conventional optical fibers. In general, PCFs have a cross-section microstructured from one or more materials, most commonly arranged periodically over much of the cross-section, usually as a "cladding" surrounding a hollow core (or several cores) where light is confined. For example, a common PCF comprises a hexagonal lattice of air holes in a silica fiber, with a hollow core at the center where light is guided. The PCF confines light by a photonic bandgap created by the microstructured cladding in the hollow (air) core. The hollow core enables higher peak irradiance coupling into the fiber without damage to the input or output faces.

Figure 2:
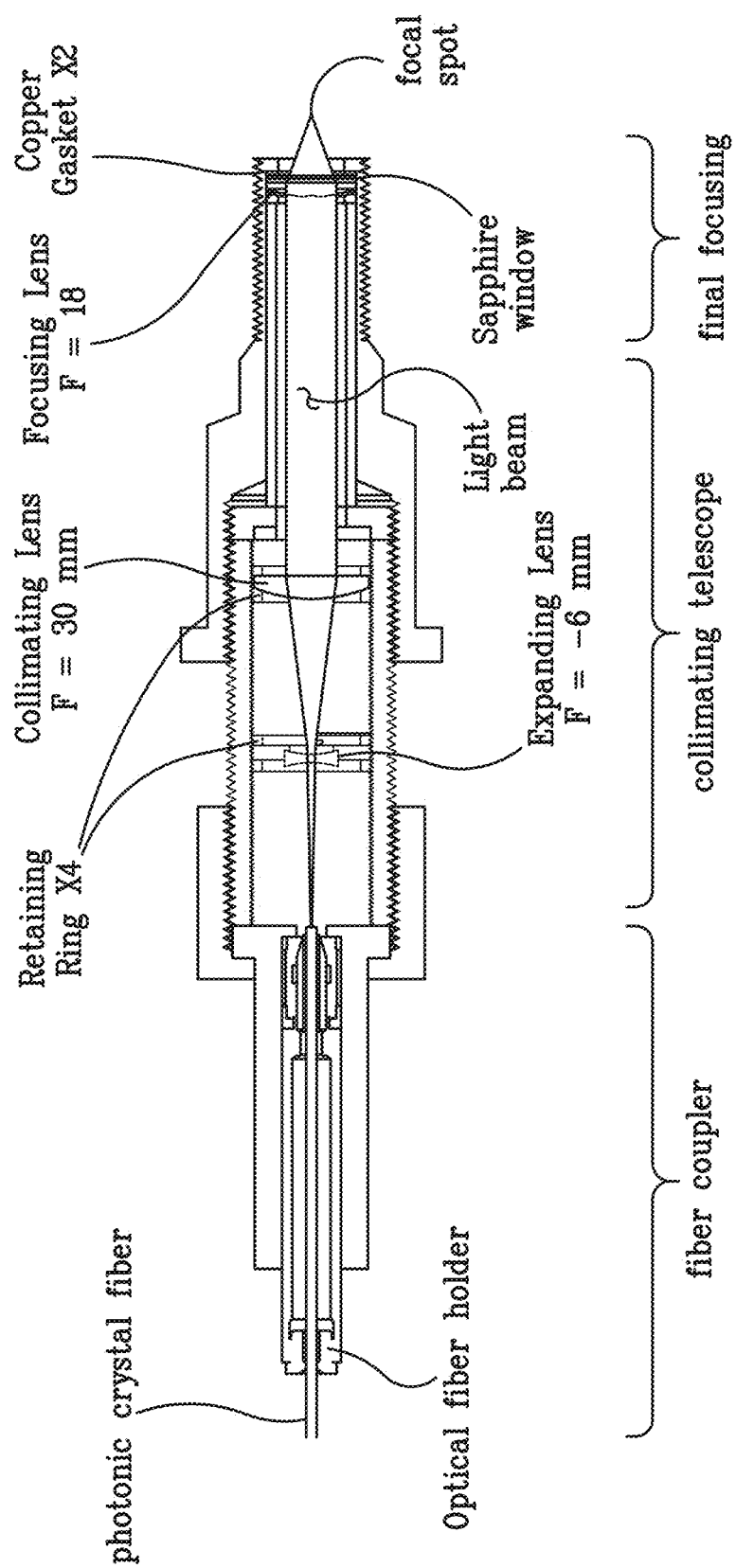
FIG. 2 is a schematic illustration of an optical spark plug that can be used for PCF delivery of a laser trigger to a HV gas switch.

As an example, laser energy can be delivered into the spark gap of a high-voltage gas switch after passing through an optical "spark plug", or PCF-delivery system, as illustrated in FIG. 2. The optical spark plug comprises three major sections: a fiber coupler, a collimating telescope, and a final focusing section. The fiber coupler allows the PCF to be installed at a prescribed location indexed relative to the collimating telescope section. An optical fiber holder with adjustable jaws can be used to hold the PCF in place. The collimating telescope (Galilean) is adjustable such that within a specific range the final collimated beam diameter can be increased or decreased slightly. Following the collimating section, the final focusing section comprises a single positive lens that is designed to produce the smallest final focal spot size, thereby creating a high energy intensity sufficient to produce a laser driven plasma in the AK gap of a gas switch.

A non-linear PCF couples the high-power Nd:YAG laser beam to the optical spark plug. This fiber couples high quality (low M²~1.25) laser light into the optical spark plug. Since the DLSS is proportional to the mode quality this gives a 2$^{nd}$ order relationship from the DLSS to the minimum energy intensity to produce plasma. Essentially, if the mode quality is reduced by a factor of 2 this yields a factor of 4 increase in the minimum laser energy to generate plasma in the AK gap, providing motivation to use a fiber that propagates the highest mode quality.

The output beam of the fiber is divergent according to the numerical aperture of the PCF in the collimating telescope section. This divergent beam propagates some prescribed distance in free space until it encounters an expanding lens (e.g., f=–6 mm), which forces the beam to diverge faster. The expanding lens enables a large collimated beam downstream, thereby producing a small DLSS. To collimate the divergent beam exiting the expanding lens, a collimating lens (e.g., f=30 mm) is placed one focal length away from the expanding lens in a Galilean telescope configuration. These two lenses are locked together and can be moved up- or downstream to produce a variable diameter collimated beam that is then propagated to the final focusing section.

De-magnification of the beam is accomplished with a focusing lens (e.g., f=18 mm) in the final focusing section. This lens is designed such that it reduces optical aberrations which would increase the DLSS and hinder performance. Given that the high voltage spark gap switch is pressurized, a sapphire window can be used to hold off the pressurized gas. An O-ring or gasket can be used to maintain the seal.

The performance of this optical spark plug was characterized using an exemplary HC PCF optimized for the 900-1100 nm range available from GLOphotonics (part number PMC-C-Yb-7C). This hypocycloid-core Kagome HC PCF has a 57 μm inner core diameter and uses a hypocycloid core contour with enhanced negative curvature to provide nearly single mode guidance with low dispersion and low loss. See B. Debord et al., *Opt. Express* 22(9), 10735 (2014); and Y. Y. Wang et al., *Opt. Lett.* 36(5), 669 (2011), which are incorporated herein by reference. By using the near single-mode propagation of this HC PCF (i.e. M²=1.2), the present invention can achieve a minimum spot size of 3-7.5 μm diameter. With a 3.5 mJ pulse delivered in 5 ns (FWHM), a peak irradiance of 3.6×10¹² W/cm² was achieved in 5 μm diameter focal spot size. The maximum transmissible energy without incurring fiber damage was about 14 mJ in a 5-ns wide pulse. A peak irradiance of 1.4×10¹³ W/cm² with a 5 μm diameter beam spot was achieved with this pulse energy. The minimum triggering of a HV gas switch was achieved with a 5 μm diameter beam using as little as 500 μJ delivered in 5 ns, providing a peak irradiance of 5.1×10¹¹ W/cm². This is still almost two orders of magnitude greater than the peak irradiance estimated for the Beverly system. Additionally, this invention leverages the ability to more easily breakdown air by using a longer wavelength laser (i.e. using 1064 nm laser emission versus the less favorable 532 nm as demonstrated in Beverly).

Figure 3:
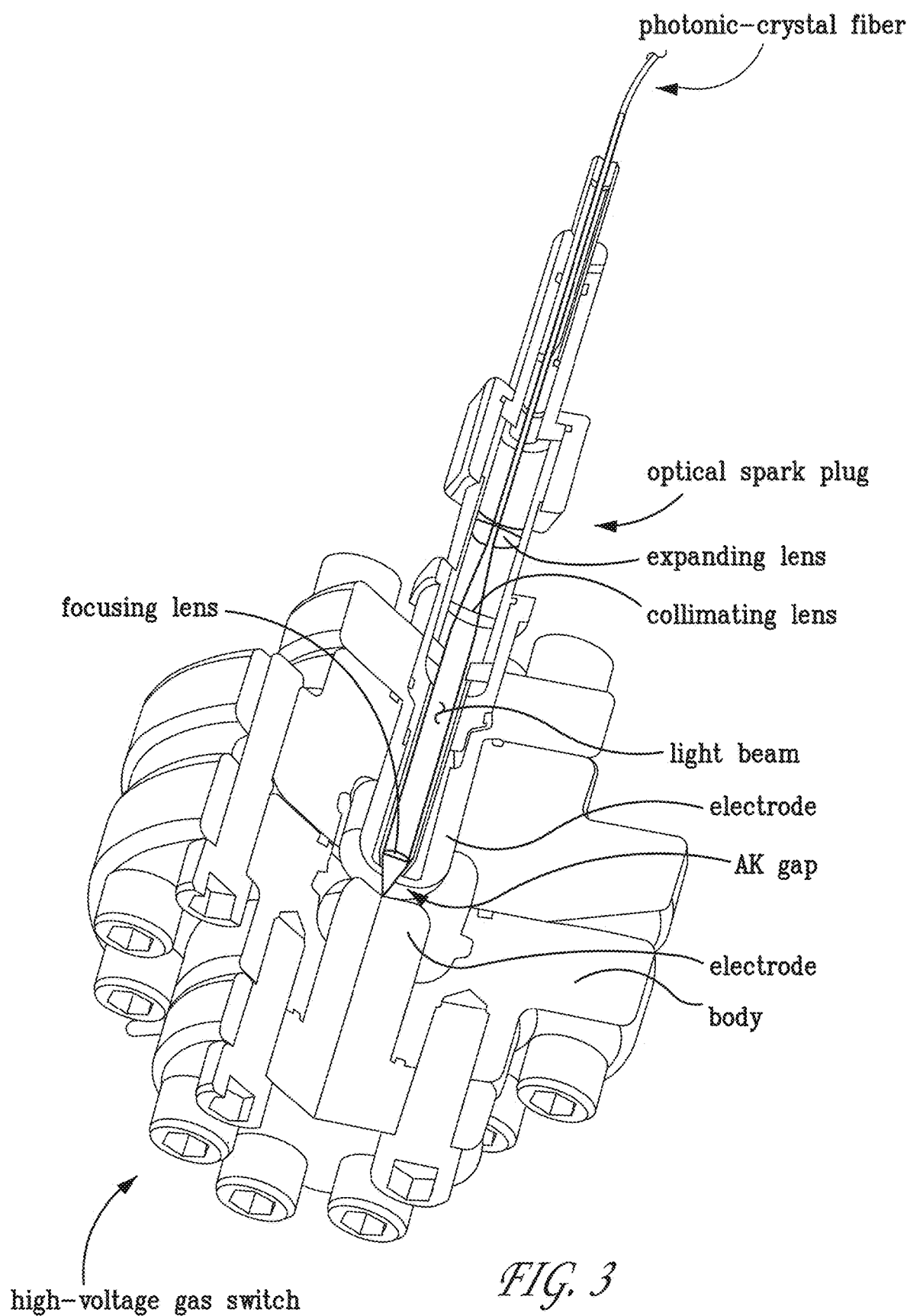
FIG. 3 is a schematic illustration of a HV gas switch with 3 mm AK gap capable of 200-400 kV operation at 850 psi dry air with a PCF-delivered laser trigger.

The optical spark plug can be incorporated into a high-voltage gas switch, as shown in FIG. 3. This gas switch is capable of operating pressures of up to 2200 psi with an AK gap separation of about 3 mm, desirable for achieving fast rise times. The exemplary switch comprises two opposing stainless-steel electrodes (forming an AK gap), a Delrin® body, and the optical spark plug. This geometry allows for positioning of the final beam waist exiting the focusing lens with respect to the opposing electrode.

The electrode geometry of the HV gas switch can be designed to reduce field stresses at the laser aperture. Finite element analysis using COMSOL Multiphysics® simulations were used to model the electric field of various electrode geometries to reduce excessive field stresses near the laser aperture. As shown in FIG. 4A, an initial design with a nominal gap and voltage yielded a peak field stress of >1000 kV/cm due to sharp features near the laser aperture. The optimized design with an even distribution of field stress, shown in FIG. 4B, provided a field stress of ~725 kV/cm with 200 kV across a 3.25 mm gap, reducing the risk of prefires and assuring that laser triggering will occur on axis.

Nearly 200 self-break tests and ~300 laser triggered tests were conducted with the improved switch and the optical spark plug shown in FIG. 3. The switch, although using a less than optimal final focusing element, was capable of producing switch run times of ~10 ns with a jitter of σ=0.4-1.7 ns (based on the rejection of outliers) over an operating range of 36%-80% of self-break at 150-175 kV, corresponding to an operational pressure range of ~1200 psi, respectively, of ultra-zero dry air with a nominal 3 mm gap with ~1 mJ of laser energy delivered into the gap.

The present invention has been described as a photonic-crystal-fiber-delivered laser-triggered high-voltage gas switch. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A laser-triggered high-voltage gas switch, comprising:
    a pressurized high-voltage gas switch having two opposing electrodes forming an AK gap therebetween, and
    a fiber-delivery system for delivering a laser trigger to the AK gap, wherein the fiber-delivery system comprises a hollow-core photonic-crystal fiber and wherein a peak irradiance of the laser trigger is sufficient to form a plasma in the AK gap and wherein a laser energy of the laser trigger is less than 14 mJ.

2. The laser-triggered high-voltage gas switch of claim 1, wherein the peak irradiance of the laser trigger is greater than $5.1 \times 10^{11}$ W/cm$^2$ for a laser having a wavelength of 1064 nm.

3. The laser-triggered high-voltage gas switch of claim 1, wherein a voltage of the pressurized high-voltage gas switch is greater than 200 kV.

4. The laser-triggered high-voltage gas switch of claim 1, wherein a gas pressure of the pressurized high-voltage gas switch is greater than 100 psi.

5. The laser-triggered high-voltage gas switch of claim 1, wherein the AK gap of the pressurized high-voltage gas switch is less than 3 mm.

6. The laser-triggered high-voltage gas switch of claim 1, wherein the laser energy of the laser trigger is less than 3 mJ.

7. The laser-triggered high-voltage gas switch of claim 1, wherein the laser energy of the laser trigger is less than 1 mJ.

8. A laser-triggered high-voltage gas switch, comprising:
    a pressurized high-voltage gas switch having two opposing electrodes forming an AK gap therebetween, wherein a voltage of the pressurized high-voltage gas switch is greater than 200 kV, and
    a fiber-delivery system for delivering a laser trigger to the AK gap, wherein the fiber-delivery system comprises a hollow-core photonic-crystal fiber and wherein a peak irradiance of the laser trigger is sufficient to form a plasma in the AK gap.

9. The laser-triggered high-voltage gas switch of claim 8, wherein the peak irradiance of the laser trigger is greater than $5.1 \times 10^{11}$ W/cm$^2$ for a laser having a wavelength of 1064 nm.

10. The laser-triggered high-voltage gas switch of claim 8, wherein a gas pressure of the pressurized high-voltage gas switch is greater than 100 psi.

11. The laser-triggered high-voltage gas switch of claim 8, wherein the AK gap of the pressurized high-voltage gas switch is less than 3 mm.

12. The laser-triggered high-voltage gas switch of claim 8, wherein a laser energy of the laser trigger is less than 14 mJ.

13. A laser-triggered high-voltage gas switch, comprising:
    a pressurized high-voltage gas switch having two opposing electrodes forming an AK gap therebetween, wherein a gas pressure of the pressurized high-voltage gas switch is greater than 100 psi, and
    a fiber-delivery system for delivering a laser trigger to the AK gap, wherein the fiber-delivery system comprises a hollow-core photonic-crystal fiber and wherein a peak irradiance of the laser trigger is sufficient to form a plasma in the AK gap.

14. The laser-triggered high-voltage gas switch of claim 13, wherein the peak irradiance of the laser trigger is greater than $5.1 \times 10^{11}$ W/cm$^2$ for a laser having a wavelength of 1064 nm.

15. The laser-triggered high-voltage gas switch of claim 13, wherein a voltage of the pressurized high-voltage gas switch is greater than 200 kV.

16. The laser-triggered high-voltage gas switch of claim 13, wherein the AK gap of the pressurized high-voltage gas switch is less than 3 mm.

17. The laser-triggered high-voltage gas switch of claim 13, wherein a laser energy of the laser trigger is less than 14 mJ.

* * * * *